United States Patent [19]

Stetson

[11] 4,204,238

[45] May 20, 1980

[54] SURGE VOLTAGE LIGHTNING ARRESTERS

[75] Inventor: Earl W. Stetson, Pittsfield, Mass.

[73] Assignee: General Electric Company

[21] Appl. No.: 875,221

[22] Filed: Feb. 6, 1978

[51] Int. Cl.[2] .................................... H02H 3/22

[52] U.S. Cl. ............................ 361/125; 361/134

[58] Field of Search ............... 361/125, 135, 136, 130, 361/126, 127, 128, 117, 134; 102/25, 32, 38, 39, DIG. 1; 315/36

[56] References Cited

U.S. PATENT DOCUMENTS

| | | | |
|---|---|---|---|
| 2,559,024 | 7/1951 | McFarlin | 361/125 X |
| 3,017,539 | 1/1962 | Robinson | 361/125 |
| 3,299,812 | 1/1967 | Suh et al. | 102/39 |
| 3,374,327 | 3/1968 | Lawrence et al. | 361/128 X |
| 3,702,419 | 11/1972 | Carothers et al. | 361/125 |

*Primary Examiner*—Patrick R. Salce

*Attorney, Agent, or Firm*—Francis X. Doyle; Richard A. Menelly

[57] ABSTRACT

A surge voltage lightning arrester ground lead disconnector utilizes a refractory metal coating on the explosive cartridge to provide a thermal delay to the arcing that occurs during disconnector operation. The thermal delay insures the explosion of the cartridge and promotes venting the arrester housing.

3 Claims, 5 Drawing Figures

SURGE VOLTAGE LIGHTNING ARRESTERS

Surge voltage lightning arresters are generally used to protect electrical equipment from damage due to an over voltage occurrence caused, for example, by a lightning surge. The arrester generally contains one or more variable resistance devices which become conductive upon the occurrence of a sufficient voltage and are shunted across the equipment to direct surge currents to ground. One contact of the lightning arrester is connected to the electrical equipment line terminal and the other lightning arrester terminal is connected directly to ground.

In the event that the lightning arrester itself becomes impaired some means is required for immediately disconnecting the arrester from the electrical system. The means commonly employed in distribution arresters is an electrical disconnector mechanism that is incorporated within the surge arrester in the vicinity of the ground connection terminal. Since the purpose of the electrical disconnect is to rapidly disconnect the arrester from the ground terminal, the connector is commonly termed a "ground lead disconnector". An efficient ground disconnector consists of an explosive cartridge adapted to the ground lead terminal for exploding upon the occurrence of an arrester failure. Besides mechanically and electrically removing the arrester from the ground connection, the ground disconnector also provides visible evidence of a damaged arrester so that the arresters can be replaced.

Since the arrester itself is hermetically sealed from the atmosphere, some means must be employed to vent the arrester after failure since a substantial pressure may develop within the sealed arrester container. Some methods currently employed for venting the arrester itself upon the occurrence of arrester failure are incorporated within the ground disconnector unit. One method, for example, employs the explosive charge within the ground disconnector to propel a pointed object through the bottom seal of the arrester to puncture the arrester seal and vent the arrester to the atmosphere. Other methods rely on the failure arc occurence to melt part of the bottom seal material and to expose the arrester to atmosphere.

One of the problems involved in the current state of the art ground lead disconnector technology is the uncertainty of the arcing location on the explosive cartridge or its container. In the event that an arc terminates on the cartridge or its container, for example, the powder may not always explode but may burn in an ineffective manner similar to a Roman candle especially if the arc burns through the case before the powder reaches ignition temperature. When the cartridge powder burns rather than explode, there is a possibility that the ground lead terminal lug will not be separated from the arrester.

Since the amount of current occurring during the over-voltage condition and upon arrester failure depends on the nature and mode of the failure, methods and material are continuously being evaluated in order to optimize the consistency of ground lead disconnection operation. These evaluations indicate that the thickness and type of material used to provide the arrester sealing disc and the manner in which the arc is terminated on the cartridge or its container are critical.

The purpose of this invention is to provide a ground lead disconnector unit having optimized arrester venting and ground lead terminal disconnect properties.

SUMMARY OF THE INVENTION

A ground lead disconnector unit employs a thin fusible arrester sealing disc in electrical arc relationship with a refractory metal coated explosive cartridge to ensure a thermal delay upon arrester failure sufficient to rapidly erode the sealing disc and to cause the cartridge to explode rather than burn.

In one embodiment of the invention, the sealing disc consists of a thin sheet of a relatively low melting point metal and the cartridge contains a coating of a high melting point metal.

GENERAL DESCRIPTION OF THE INVENTION

Figure 1:
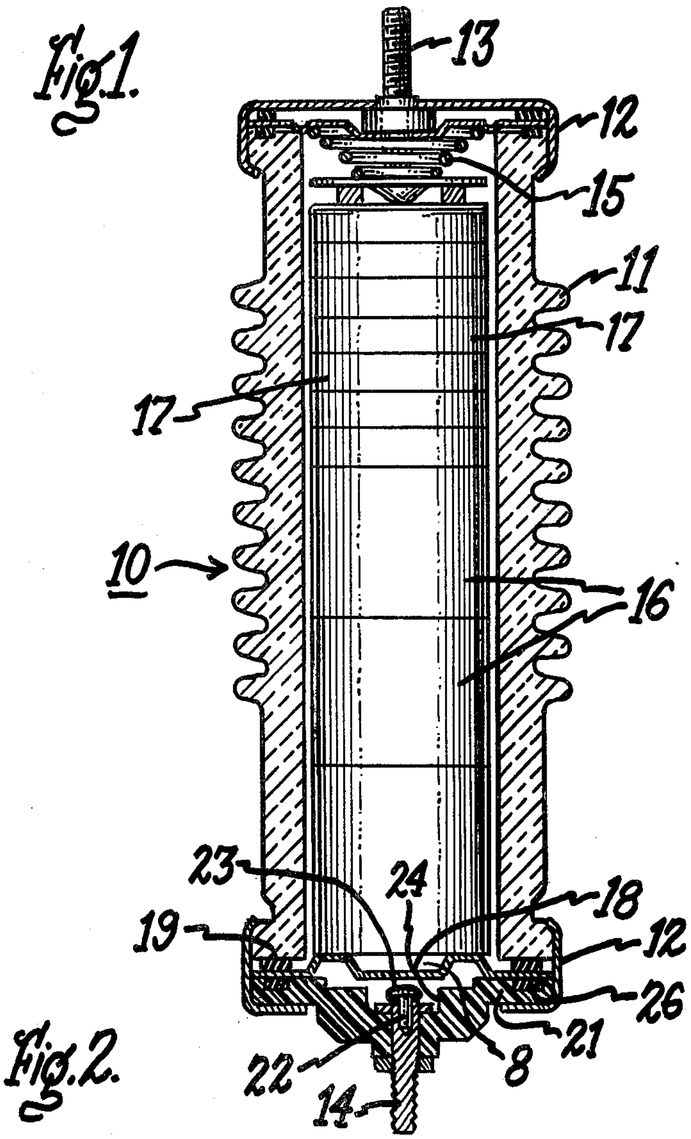
FIG. 1 is a side sectional view of a surge distribution arrester for use with the arrester disconnector of the invention.

FIG. 1 shows a lightning arrester 10 consisting of an insulated housing 11 enclosed at each end by a pair of metal caps 12. The arrester 10 is connected to lines by means of line connector 13 and to ground by ground connector 14. A spring member 15 applies tension to a plurality of nonlinear varistor discs 16 and series gap units 17. The insulating housing 11 is sealed hermetically from the atmosphere by means of gaskets 19 at both ends of the insulator housing 11. The ground lead disconnector assembly 9 is separated from the insulating housing 11 by means of a metal sealing disc 18. The ground lead disconnector 9 further includes a plastic type base 21 which is connected to the insulating housing 11 by means of metal housing clamp 12. An explosive type cartridge 22 is located within a well portion 24 within base 21 and the top section 23 of the cartridge 22 is located in close proximity with sealing disc 18. As described earlier the lightning arrester 10 provides for electrical conduction to ground in the event of an overvoltage occurrence sufficient to cause gap units 17 to sparkover and nonlinear discs 16 to be conductive. In the event of arrester failure an arc is caused to occur between the sealing disc 18 and the top section 23 of the cartridge 22 in order to cause the powder within the cartridge 22 to explode and to break away a portion of the plastic base 21 and disconnect the arrester 10 from the ground connector 14.

In prior art disconnectors of various design effective means for consistently preventing a cartridge misfiring or a partial explosion has not always been accomplished. As discussed earlier unless a complete explosion occurs the disconnecting operation may not be successful. The most reliable way of assuring such an explosion is to make certain the cartridge powder reaches the explosive temperature while still completely confined within the cartridge case. The subject invention uses a "thermal delay" system to guarantee this occurrence. The degree of thermal delay depends to a great extent upon the materials employed for both the top section 23 and the sealing disc 18. Furthermore, it was recognized early in the development that it would be desirable to vent arrester 10 of FIG. 1 once the arrester failure became imminent in order to prevent excessive internal pressure being built up within housing 11 of FIG. 1. Subsequently it was discovered that the most effective way of accomplishing the venting was to select a proper material and thickness for sealing disc 18 and to directly terminate the failure arc on this disc. The subsequent discussion will show how the dual functions of arrester venting and reliable disconnector operation can be accomplished. A novel ground lead connector having a built-in thermal delay mechanism and a means to simultaneously vent the arrester housing is discussed in detail below.

DESCRIPTION OF THE PREFERRED EMBODIMENT

Figure 2:
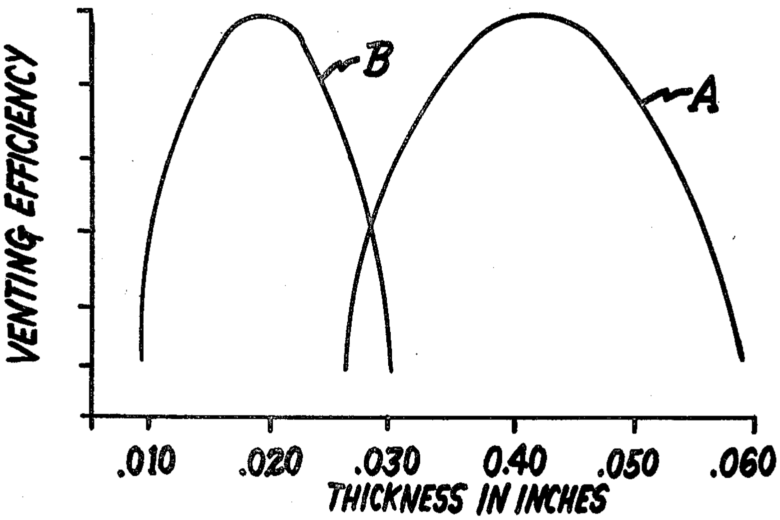
FIG. 2 is a graphic representation of the arrester sealing disc venting efficiency as a function of thickness.

The venting efficiency for different metal sealing discs 18 of the type shown in FIG. 1 can be seen by referring to FIG. 2. The venting efficiency for a steel sealing disc B is shown as a function of the disc thickness in inches. It can be seen that the thin disc has an optimum venting efficiency in the order of 0.010 to 0.030 inches. The variation in venting efficiency as a function of the disc thickness of the sealing disc is caused by the ability of the arc to bore a hole through the disc during the thermal delay. If the sealing disc 18 is quite thin, in the order of 0.010, for example, the disc rapidly becomes eroded and if the disc 18 is quite thick, such as around 0.030", the arc is unable to erode and penetrate through the disc 18 during the thermal delay period. The venting efficiency is shown to vary further as a function of the disc material. The venting efficiency for an aluminum disc is shown at A in FIG. 2. The optimum thickness for aluminum is approximately 0.040" since the aluminum has a lower melting point than steel. A thicker sealing disc of aluminum is required in order to efficiently vent the arrester during an equivalent thermal delay.

Figure 3:
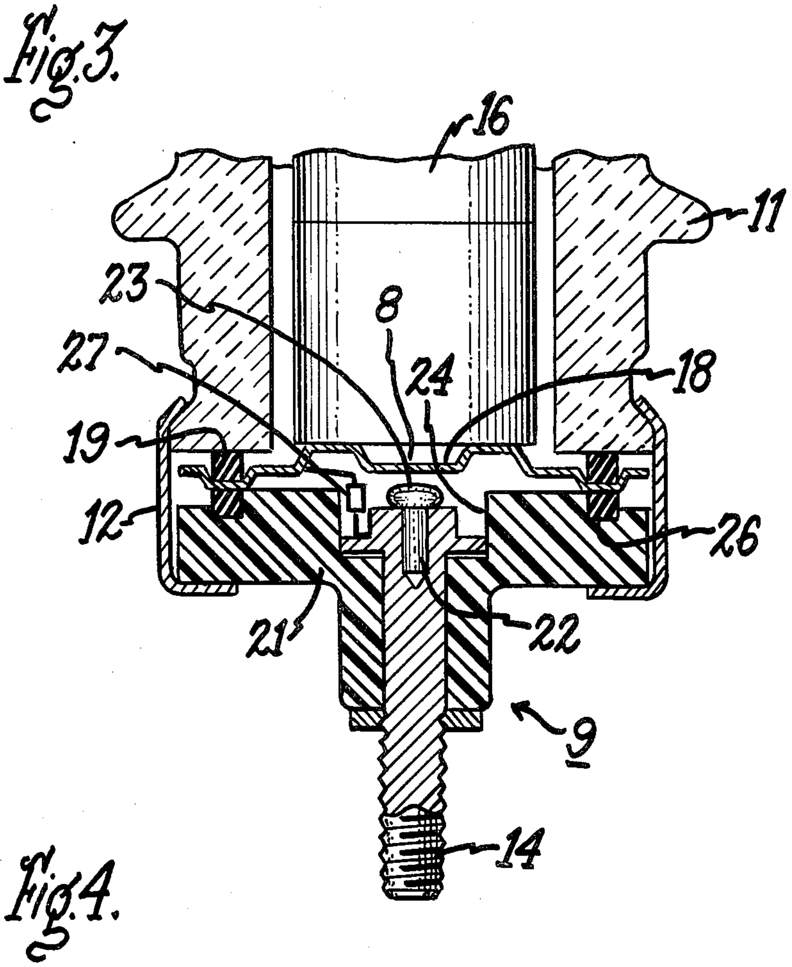
FIG. 3 is a side more detailed sectional view of a ground disconnector according to the invention.
Figure 4:
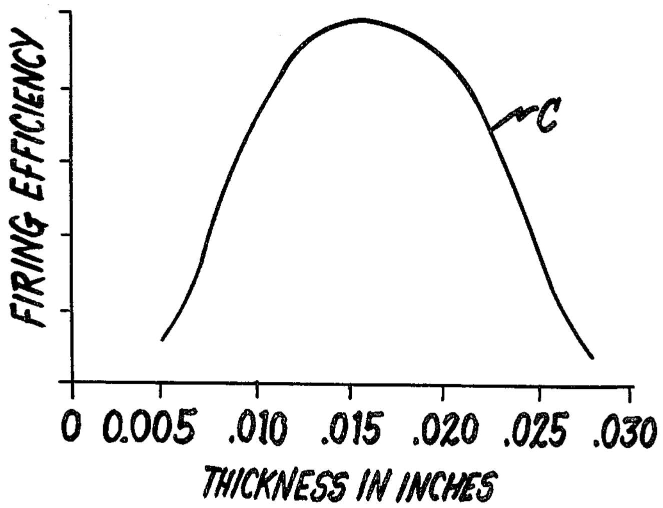
FIG. 4 is a graphic representation of the firing efficiency of the ground disconnector of FIG. 3 as a function of refractory metal coating thickness.

FIG. 3 shows an effective ground lead disconnector 9 having a built-in thermal delay mechanism. The ground connector 14 includes a standard explosive cartridge 22 with a special top section 23. The housing 11 is separated from ground lead connector 9 by means of a single sealing disc 18 having holding gaskets 19 and 26 for hermetically sealing the housing 11 and the ground lead disconnector 9, respectively. The sealing disc 18 is embossed in such a manner as to provide a free access 8 between the interior housing 11 and the interior of disconnector 9 when sealing disc 18 is eroded through by the arc. As is common with other ground disconnector devices, a resistor 27 is electrically connected between the sealing disc 18 and the ground connector 14. The purpose of the bypass resistor 27 is to provide electrical continuity with ground and provide a path for normal arrester leakage currents. The required thermal delay for the reliable operation of disconnector 9 is provided by a refractory metal coating 23 on the top section of cartridge 22. It has been determined that an efficient time delay and arrester venting can be provided when the sealing disc 18 comprises an arc erodable material such as aluminum, copper or various steel alloys; and when the top section 23 is provided with an arc resistive refractory metal such as tungsten, molybdenum, etc. The presence of the refractory metal coating 23 impedes the arc erosion of the top section until the powder within cartridge 22 reaches its exploding temperature. When the teaching of the subject invention is followed, the failure arc erodes through sealing disc 18 at approximately the same time that cartridge 22 explodes. The venting of housing 11 allows the high pressure gases developed therein by the failure to rapidly and immediately evacuate. The firing efficiency of the cartridge 22 is measured by the reliability of the explosion as opposed to burning or a partial explosion of the powder therein. FIG. 4 shows the firing efficiency C as a function of the thickness of the refractory metal coating applied to the top section 23 for the embodiment of FIG. 4. Firing efficiency C is for a flame deposited tungsten coating and the optimum firing efficiency occurs in the range of 0.010 to 0.020". The firing efficiency relationship as a function of coating thickness is similar in some respect to the venting efficiency described earlier in FIG. 2. When the refractory metal coating is greater than 0.030" for example, the mass of the coating can excessively delay the heating of the powder to its explosive temperature. When the coating thickness is in the order of 0.005" or less, the firing efficiency is only improved to a small extent. For efficient arrester venting and disconnector explosion the properties of the disc material and refractory coating material must be carefully considered. In order to ensure an adequate thermal delay, the refractory metal coating must have a high melting point to keep the arc from eroding through section 23 and causing the powder to burn. The disc material must bave a low melting temperature in order to ensure that the disc becomes melted through during the thermal delay period. For the embodiment of FIG. 3, the sealing disc 18 comprises aluminum and the refactory metal coating 23 comprises tungsten. The tungsten is applied by a flame coating process for convenience only. Other methods of metal deposition such as electro-chemical or vacuum deposition can be employed. The use of thin refractory metal discs in place of a refractory metal coating can also be used to cause the requisite thermal delay.

Figure 5:
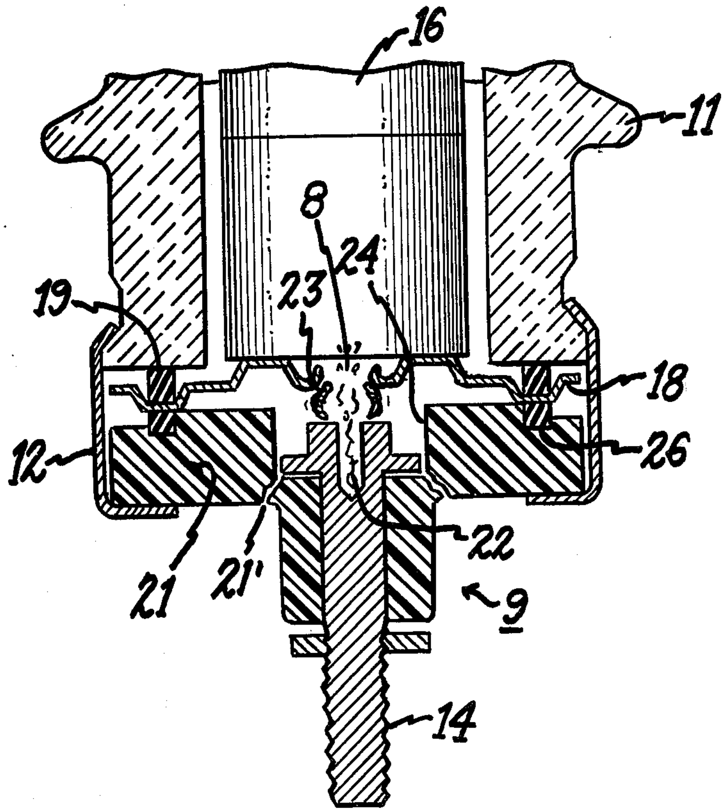
FIG. 5 is a side sectional view of the ground disconnector of FIG. 4 on the occurrence of an arrester failure.

The arrester venting and ground lead disconnect features of the embodiment of FIG. 3 can be better understood by reference to FIG. 5.

The base 21 is made of a multiple plastic substance which becomes ruptured as shown by 21' upon cartridge firing. The arrester ground lead 14 is now permanently disconnected from the failed arrester and the distribution system is not faulted to ground.

Although the ground lead disconnector having thermal delay according to the invention is described for use with lightning arresters for protecting distribution system electrical equipment from overvoltage conditions, this is by way of example only. The disconnector of the invention finds application wherever a surge arrester may be utilized and arrester venting and ground disconnect functions may be required.

What I claim as new and desire to secure by Letters Patent of the United States is:

1. An improved ground disconnector for a surge arrester of the type having a metal sealing disc and an explosive cartridge, the improvement which comprises:

an embossed aluminum sealing disc having a raised portion for electrically connecting with the surge arrester and a flat portion in arc relationship with the explosive cartridge; and a refractory metal coating having a thickness of from 0.005" to 0.030" deposited on a portion of the explosive cartridge to provide a thermal delay to the explosive.

2. The disconnector of claim 1 wherein the sealing disc comprises 0.010 to 0.060 of an inch in thickness.

3. The improved ground disconnector of claim 1 wherein the refractory metal coating is selected from the group consisting of tungsten or molybdenum.

* * * * *